Figure 1:
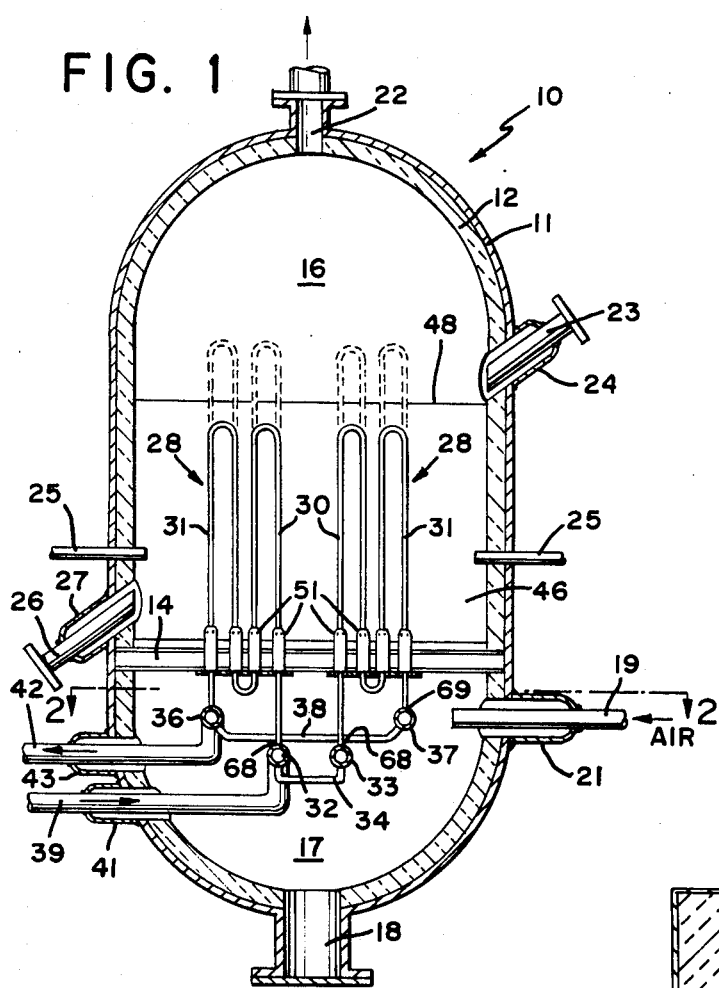

United States Patent [19]

Steever et al.

[11] 3,982,901

[45] Sept. 28, 1976

[54] HEAT TRANSFER ELEMENT AND TUYERE FOR FLUIDIZED BED REACTOR

[75] Inventors: Andrew Beaumont Steever, Old Greenwich; Walfred Wilhelm Jukkola, Westport, both of Conn.

[73] Assignee: Dorr-Oliver Incorporated, Stamford, Conn.

[22] Filed: June 25, 1975

[21] Appl. No.: 590,141

[52] U.S. Cl. ............................... 23/284; 23/288 S; 23/288 L; 423/542; 432/58; 34/57 A; 165/104 F; 165/134; 122/4 D; 138/38
[51] Int. Cl.² .......................................... F28D 13/00
[58] Field of Search ............... 23/284, 288 S, 288 L; 423/542; 432/58; 34/57 A; 165/104 F, 134; 122/4 D; 138/38

[56] References Cited
UNITED STATES PATENTS

| | | | |
|---|---|---|---|
| 1,203,625 | 11/1916 | Jacobus | 138/38 |
| 2,619,451 | 11/1952 | Ogorzaly et al. | 23/288 S X |
| 3,174,834 | 3/1965 | Edwards et al. | 23/284 |

*Primary Examiner*—James H. Tayman, Jr.
*Attorney, Agent, or Firm*—H. M. Snyder; Burtsell J. Kearns; Theodore M. Jablon

[57] ABSTRACT

A fluidized bed reactor is provided with heat exchange coils for controllng the temperature of the fluidized bed. The heat exchange coils are vertically oriented and elements thereof pass through the constriction plate of the reactor. Multiple function Tuyere elements are provided which admit air into the reaction chamber from the windbox, provide for passage of elements of the heat exchange coils through the constriction plate, structurally support the heat exchange coils in position and constitute thermal sleeves for accommodating differential thermal expansion of the heat exchange coils and the constriction plate.

12 Claims, 6 Drawing Figures

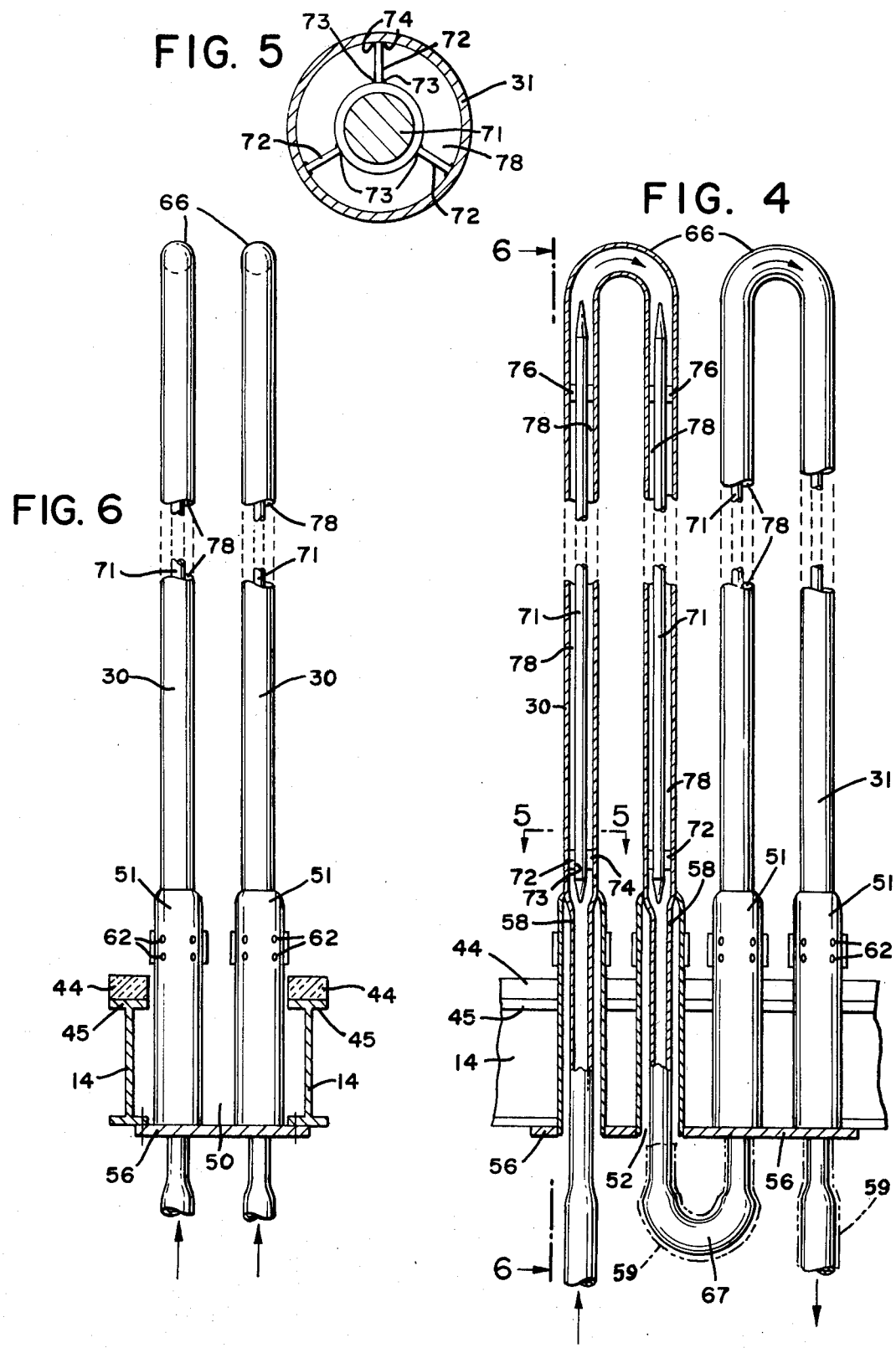

HEAT TRANSFER ELEMENT AND TUYERE FOR FLUIDIZED BED REACTOR

This invention is directed to a novel tuyere and heat exchanger structure for a fluid bed reactor.

Fluidized bed reactors are extremely versatile apparatus, which, in various forms, can carry out the processes of drying, sizing, roasting, calcining, heat treatment of solids with gases in the chemical, metallurgical and other materials processing fields, and the generation of hot gases, including steam, for use in driving electric power generation equipment. When the fluidized bed reactor is employed to carry out exothermic reactions, it is often necessary to prevent excessively high temperatures within the reactor by providing cooling means either within the freeboard volume or within the bed of fluidized solids. The cooling means may take the form of cooling coils through which a process fluid, which may be a gas or a liquid, is circulated to remove the excess heat. The heat removed by the fluid may often be used for heating in other stages of a process or for power generation. Sometimes the cooling coils are located in the walls of the reaction chamber where they are well protected from the often severe erosive and corrosive conditions within the reactor chamber.

The conditions within the fluidized bed are most severe of all in exothermic reactions because the temperature in the bed is likely to be higher than elsewhere in the reactor and the violently agitated and relatively high concentration of particulate solids lead to the most erosive conditions to be found in the reactor. It has been customary to orient in-bed heat exchanger coils horizontally, with coils of hairpin configuration serially joined. Horizontal coil configurations of this type are to be seen in British Pat. No. 895,791, published May 9, 1962, U.S. Pat. No. 2,789,034 to J. W. Swaine et al, issued Apr. 16, 1957, and in U.S. Pat. No. 2,825,628 to A. Johannsen et al, issued Mar. 4, 1958. In general, horizontal configurations are best where only a modest amount of heat exchange surface area is required because the horizontal coils have a relatively simple mode of entry and support through the side of the reactor. Vertical orientation of the coils either clutters the freeboard region with headers and support structure or complicates the structure associated with the constriction plate.

In pressurized heat exchangers the fluidized bed tends to be rather compact due to the elevated pressure. This compact bed permits a reduction in size of the reaction chamber and gives rise to a high heat transfer rate from the solids of the bed to the heat exchange coils. However, in order to take advantage of these virtues of the pressurized fluid bed heat exchanger, it is necessary to have a high concentration of coils within the fluidized bed. Furthermore, in order to achieve adequate mass flow rate within the coils so that the desired heat transfer rate to the cooling medium is attained, and for other reasons such as eliminating steam hammering, it has been found necessary to have many coils connected in series.

Horizontal coils are subject to abrasion which is many times greater than that experienced by vertically oriented coils. Such exposure to abrasion has a drastic effect on the life expectancy of horizontal coils and, under the same service conditions, vertical coils will have a life expectancy of at least three to five times that of horizontal coils. In the case of vertically oriented coils the return bends, which serially connect the vertical runs of tubing, are subject to the greatest abrasion due to the local turbulence created by the bends which, of course, have a horizontal orientation aspect.

A novel structure has now been provided within a fluid bed reactor in which the heat exchanger coils are vertically oriented, with the lower return bends thereof located below the constriction plate of the reactor, and so not subject to erosion in the bed, and traversing the constriction plate in a combined structure with the tuyeres of said constriction plate.

It is an object of this invention to provide an improved heat exchanger structural arrangement within a fluidized bed reactor in which vertical runs of heat exchanger tubing tranverse the constriction plate of the reactor.

It is a further object of this invention to provide in a fluidized bed reactor having a vertically oriented heat exchanger a tuyere structure which accommodates and supports vertical heat exchanger tubing traversing the constriction plate.

Figure 2:
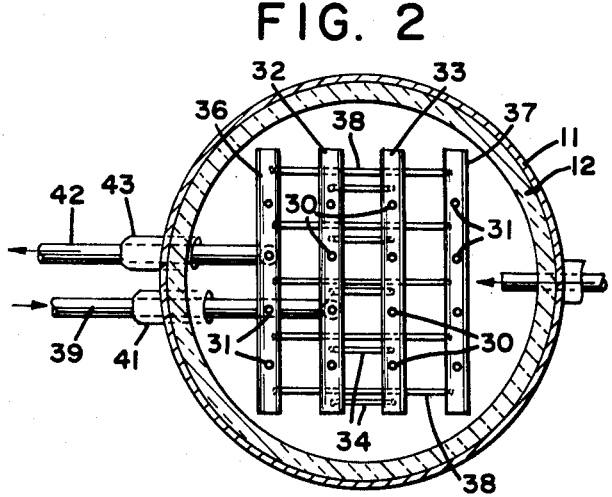
Figure 3:
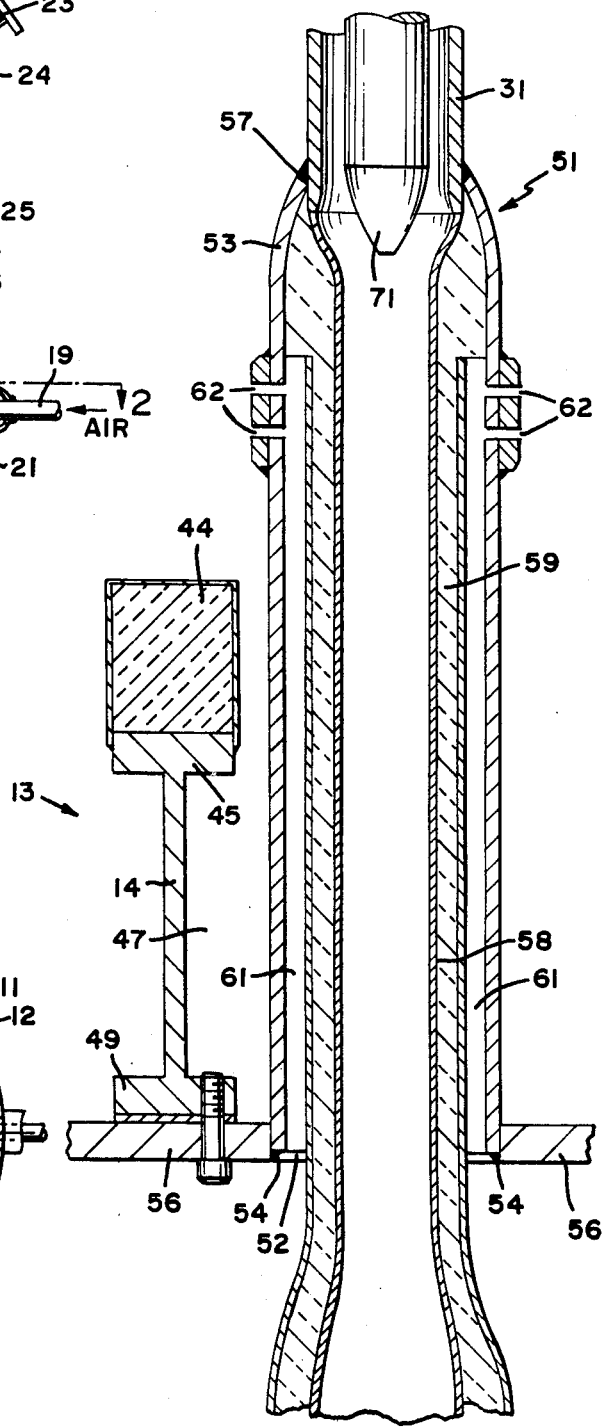

Other objects and advantages will become apparent from the following description taken in conjunction with the accompanying drawings in which:

FIG. 1 is a view partially in section of a fluidized bed reactor incorporating vertically oriented heat exchanger coils and tuyeres in accordance with this invention, FIG. 2 is a plan view of the header structure for the heat exchanger taken along line 2—2 of FIG. 1, FIG. 3 is a sectional view of the tuyere structure of this invention, FIG. 4 is an enlarged view of one heat exchanger coil, partially in section, in accordance with this invention, FIG. 5 is a sectional view showing the interior of one of the heat exchanger tubes taken along line 5—5 of FIG. 4, and FIG. 6 is a view of the heat exchanger and tuyere structures taken along lines 6—6 of FIG. 4.

Generally speaking, the heat exchanger coil array of the present invention comprises a plurality of vertically oriented coils or platens in which the lower return bends of the coils are positioned below the constriction plate of the fluid bed reactor while the vertical tubing runs thereof pass through the constriction plate centrally of the tuyeres in the constriction plate and are supported by said tuyeres.

More specifically, a fluid bed reactor is provided having vertically oriented heat exchanger coils in the fluidized bed region with the lower return bends thereof located below the constriction plate of the fluid bed reactor with inlet and outlet headers for the heat exchanger coils located in the reactor windbox. The vertical tubing runs of the heat exchanger coil pass through and are supported by and fixed to the tuyeres of the constriction plate. Within the tuyeres, the vertical tubing runs may have a constricted diameter with an annular air passageway in the tuyere surrounding the heat exchanger tubing for providing communication between the windbox of the reactor and the tuyere ports. An insulating layer surrounds the heat exchanger tubing within the tuyere and defines the inner surface of the air passageway. The tuyere is an elongated structure welded at the bottom thereof to a removable plate while at the upper end thereof it is welded to the heat exchanger tubing. The removable plate is secured to the support structure of the constriction plate. The elongated configuration of the tuyeres and the fact that there is but a single point of support for each run of vertical tubing enables them to function as a thermal sleeve between the constriction plate and the heat exchanger tubing.

Referring now to the drawings, in FIG. 1 there is shown a fluidized bed reactor 10 which incorporates vertically disposed heat exchanger coils 28 arranged within reactor 10 in accordance with the present invention. Fluidized bed reactor 10 has a metal outer shell 11 which is lined with a layer of refractory insulation 12. The interior of the reactor 10 is divided into two compartments by the constriction plate 13, with a reaction chamber 16 above the constriction plate 13 and a smaller windbox 17 below the constriction plate 13. A plurality of horizontal steel beams 14 near the top of the windbox 17 provide support for the constriction plate 13. A gas inlet conduit 19 is provided for supply fluidizing gases to the windbox 17. At the point where gas inlet conduit 19 passes through the wall of the reactor shell, a thermal sleeve 21 is provided to minimize stress on the wall of the reactor vessel as a result of a temperature differential between the conduit 19 and the shell 11. The windbox 17 is provided with a cleanout port 18 through which any solid particulate matter accumulated in the windbox may be removed. Exhaust outlet 22, having access to the freeboard region of the reaction chamber 16, is provided for the purpose of conducting the off-gases from the reaction chamber 16. Feed inlet 23 passes through the wall of the reaction chamber 16 and is used to replenish bed material. A thermal sleeve 24 is provided for the feed inlet 23. A discharge conduit 26, with its own thermal sleeve 27, gives access to the reaction chamber for the removal of excess or spent bed material. One or more fuel guns 25 and peripherally located about the reactor to deliver fuel into the reaction chamber. Tuyeres 51 are provided in the constriction plate for admitting fluidized air into the reaction chamber 16 and for other purposes as shall be described hereafter. A body of solid particulate matter 46 rests on the constriction plate 13 and, in response to gases admitted into the reaction chamber 16 through tuyeres 51, becomes an expanded fluidized bed occupying the reaction chamber to the level indicated at 48. Bed material may sift downward to fill the space 50 adjacent to the tuyeres within the constriction plate 13.

The header arrangement for the heat exchanger coils is located in the windbox and is shown in detail in FIGS. 1 and 2. Thus, a process fluid inlet 39 passes into the windbox 17 through the shell 11 and the refractory lining 12 by means of a thermal sleeve 41. Within the windbox the process fluid inlet is connected to header 32 which, through connection conduit 34, is connected to inlet header 33. The inlet headers 32 and 33 are connected to a plurality of heat exchanger coils through junctions 68 at certain of the vertical tubing runs 30. At the opposite end of each heat exchanger coil, also within windbox 17, there is located an outlet header 36 connected to a second outlet header 37 through the connecting conduits 38. The outlet headers 36, 37 are connected to the vertical tube runs 31 at junctions 69. A process fluid outlet 42 is connected to the header 36 and passes through the wall of the reactor by means of thermal sleeve 43.

The relationship of the tuyeres 51, the constriction plate 13 and the vertical runs of heat exchanger tubing 31 are best seen in FIG. 3. Horizontal beams 14, which are anchored in the wall of the reactor 10, have a top flange 45 which provides support for boxed insulation 44 constituting the main support surface of the constriction plate 13. The beams 14 have bottom flanges 49 to which there are secured, by bolts or similar means, removable plates 56 which are generally rectangular in configuration. Each of the removable plates 56 has welded thereto, as by the welds 54, a plurality of tuyeres 51. The tuyeres 51 comprise an elongated metal shell 53 which extends from the removable plate 56 upward to a level above the surface of the constriction plate 13. At a level above the top surface of the constriction plate 13 the tuyeres 51 are provided with a plurality of ports 62 which pass through the wall 53 of the tuyere. The vertical run of heat exchange tubing 31 is located centrally of and along the longitudinal axis of the tuyere 51. The tuyere 51 is secured at its upper end to the vertical run of tubing 31 by the weld 57. Internally of the tuyere 51 the vertical tubing 31 has a reduced diameter portion 58 extending most of the length of the tuyere 51. Within the tuyere the reduced tubing 58 is in contact with and surrounded by a layer of insulation 59. Between the insulating layer 59 and the shell 53 of the tuyere, is annular air passage 61, which extends from the ports 62 to the bottom of the tuyere 51 to communicate with the windbox 17.

In FIG. 4 the internal structure of the vertical runs of tubing within the fluidized bed 46 is disclosed and the relationship to the tuyere structure is evident. It will be noted that the flowpath through the vertical runs of tubing 31 is an annular channel 78, since the central portion of the tube 31 is occupied by the tube core 71. The tube cores which are solid members, are supported in their central position by the radial lugs 76. The set of lugs at the lower end of the tube cores 71 is shown in plan in FIG. 5. It will be seen that the lugs 76 are welded to the core 71 by the welds 73. The lugs 76 are also welded to the tubing 31 by the welds 74. The arrangement of the lugs at the upper end of the cores 71 is quite similar to that just discussed except that the lugs 76 need not be welded to the tubing 31.

In the operation of the fluid bed reactor which incorporates the present invention, fuel is introduced through the fuel guns 25. Injection air may be introduced with the fuel through fuel guns 25 either as a fuel carrier for solid fuels or to improve fuel dispersion where liquid fuel is employed. Fluidizing gases, which may be at an elevated temperature, are introduced through inlet conduit 19. The gas passing through inlet conduit 19 traverses the constriction plate 13 through the tuyeres 51 and issues from the tuyere ports 62 to fluidize the particulate solids within the reaction chamber 16. The combustion gases generated in the bed 46 move through the bed to the freeboard space in the reaction chamber 16. From the freeboard space the gases are conducted away through the exhaust outlet 22 for further treatment and/or disposal. The process fluid is introduced by means of the process fluid inlet 39 which connects to the inlet header 32. By means of the connecting pipes 34 inlet 39 is also connected to the header 33. The inlet end tubes 30 of the heat exchanger coils are connected to the headers 32 and 33 and the fluid traverses the heat exchanger coils to remove the heat from the bed and thereby reach the desired temperature for the process fluid. The hot process fluid is discharged into the outlet headers 36 and 37 through outlet end tubes 31. The headers 36 and 37 communicate with each other through the connecting pipes 38. From the outlet headers the process fluid moves through the process fluid outlet 42 by which it may be conducted to apparatus (not shown) for recovering heat or for power generation or for other purposes. In traversing the constriction plate 13 the process fluid flows through the tubing 58 which lies within the tuyere 51. As shown, the tubing within the tuyere is of restricted diameter, but in other cases, tubing of uniform diameter may be used. Since the process fluid is quite hot within the tuyere, an insulating layer 59 is provided on this portion of the tubing, serving to retain that heat which might otherwise be lost to the gas flowing in the annular channel 61 of tuyere 51. For this same purpose, insulation may be provided on the lower return bends. The core 71 in the vertical tubing 31 aids in obtaining the desired heat transfer rate. With this core in place a tubing 31 of relatively large diameter having increased surface area is exposed to the hot fluidized solids in the fluidized bed. It is the increased surface area which leads to the higher heat transfer rate. The fluid in each heat exchange coil follows a serpentine path first leading upwardly into the tubing exposed to the fluidized solids, then downwardly through tubing exposed to the fluidized solids, into the tuyere insulated by the insulating layer, through the lower return bend and thence upwardly through another tuyere and into the vertical tubing for additional heating. Ultimately the process fluid reaches the outlet headers 36 and 37 from which the process fluid moves through the process fluid outlet 42 for connection to apparatus (not shown) for recovering heat or for power generation or for other purposes.

The particulate solids in the fluidized bed are in violent motion when the fluidized bed reactor is in operation and, consequently, attrition of the bed particles is a continuing condition. The fines produced in the bed in this way generally leave the reaction chamber with the exhaust gases. For this reason, the particulate solids of the bed must be replenished from time to time and conduit 23, which communicates with the reaction chamber, provides a means for introducing additional particulate solids into the reaction chamber. In the case of some reactions which occur in the bed, the bed solids become spent or exhausted and must be replaced. Conduit 26 provides a means for removing spent bed solids. By adding new particulate solids through conduit 23 as bed material is discharged at another point, the character of the fluidized bed can be stabilized.

In one application of the fluidized bed reactor of this invention, the reactor is employed to burn coal as a fuel and thereby generate hot gases capable of driving a gas turbine which, in turn, drives a generator for the production of electric power. The use of combustion gases from the burning coal for driving gas turbines has the disadvantage that the combustion gases often contain large amounts of sulfur compounds which make the gases highly corrosive when contacting the turbine blades. Further, the discharge of noxious gases containing sulfur compounds into the atmosphere is undesirable from the environmental point of view. The combustion gases also contain substantial amounts of solids which are erosive (abrasive) when they impinge upon the turbine blades. Accordingly, a substantial amount of gas cleaning apparatus must be interposed between the fluidized bed reactor and the gas turbine and traversing this apparatus results in considerable pressure drop and, hence, loss in energy. The apparatus described herein tends to minimize these problems, first, by lowering the sulfur content in the combustion gases, and second, by reducing the dust content of the hot gases. The first objective is attained by proper temperature control in a fluidized bed with appropriate bed solids, while the second objective is realized by using hot dust-free air as one component of the hot gases employed for driving the gas turbine.

For this application, air is admitted through inlet conduit 19 at a temperature of about 650°F. The fluidized bed is composed of limestone or dolomite having an average particle size of up to ⅛ inch diameter or so. Crushed coal is introduced into the fluidized bed through the fuel guns 25. The coal burns in the fluidized bed which reaches a controlled temperature of about 1700°F. The sulfur in the coal tends to react at this temperature with the limestone of the bed and the product of this reaction, $CaSO_4$, remains in the bed (When dolomite is used, some $MgSO_4$ is also formed). The calcium sulphate thus formed in the fluidized bed may be removed through the discharge conduit 26 while fresh limestone is introduced through the inlet conduit 23. It is of interest to note that the calcium sulphate discharged from the fluidized bed may be reheated in other apparatus (not shown) to drive off the $SO_3$ gas as the initial step in the production of sulphuric acid, while the lime thus produced may be returned to fluid bed reactor 10 for reuse in this process.

The process fluid introduced into inlet conduit 39 is preferably air and, in the course of traversing the heat exchanger coils 28 and 29, reaches a temperature of about 1360°F. This clean, hot air may then be directed to the gas turbine. The combustion gases issuing from gas outlet conduit 22 are substantially free of sulfur and need only have the dust particles removed therefrom before admitting the combustion gases to the gas turbine.

As has been indicated previously, the violent agitation of the particulate matter in the fluidized bed has an extremely erosive effect on the upper return bends 66 of the heat exchanger coils, while the vertical tube runs 31 are less subject to erosion. Accordingly, the upper return bends must either be armored; i.e. formed of tubing having a very heavy wall, or the upper return bends must extend well above and out of the fluidized bed of solids (See the dotted line showing in FIG. 1). Extending the upper tube bends above the level of the fluidized bed does involve some sacrifice in heat transfer efficiency.

The lower return bends 67, as described above, are located below the constriction plate 13 in windbox 17 and so are not subject to bed erosion. The removable plates 56, which are integral with the tuyeres 51 and the heat exchanger coils, provide a means for readily removing the heat exchanger coils and tuyeres for replacement or repair. Removal is simply a matter of withdrawing the bolts holding the plates to the lower flange 56 and then the coil assembly will drop free of the constriction plate 13 and can be removed through a manhole (not shown) in the windbox 17.

While horizontally oriented fuel guns have been illustrated, it is also possible and sometimes desirable to have the fuel guns vertically oriented and penetrating the constriction plate through the windbox 17. Thus, a predetermined number of vertically oriented fuel guns could be substituted for certain of the tuyeres 18 illustrated. One type of vertically oriented fuel gun is shown and described in U.S. Pat. No. 3,861,862, which issued Jan. 21, 1975 to the inventors of the present invention.

Air has been indicated as the process fluid of interest in the present case, but it is also possible to employ other heat treatment media, such as water, and even, in some cases, the liquid metal NaK.

There has thus been presented a novel combined tuyere and heat exchanger structure which simplifies the installation and operation of vertically oriented heat exchanger coils for heat transfer within the fluidized bed.

Although the present invention has been described with particular reference to preferred embodiments, it will be apparent to those skilled in the art that variations and modifications may be made without departing from the essential spirit and scope of the invention. It is intended to include all such variations and modifications.

We claim:

1. A fluid bed reactor comprising a reaction chamber, a windbox separated from said reaction chamber by a constriction plate, a body of particulate solids subject to fluidization on said constriction plate, a plurality of heat exchanger coils comprising vertically oriented runs of tubing serially joined by upper and lower return bends, said vertical runs of tubing passing through said constriction plate and located in contact with said body of particulate solids for heat exchange with said solids in the fluidized state, said lower return bends located below said constriction plate, a plurality of elongated tuyere means in said constriction plate and extending into said reaction chamber having the combined functions of admitting fluidizing gas through said constriction plate into said reaction chamber, providing access through said constriction plate for said vertical runs of heat exchange tubing, supporting said vertical runs of tubing and providing thermal sleeves to accommodate differential thermal expansion between said constriction plate and said vertical runs of tubing, said tuyeres each having therein an outer annular gas passageway for fluidizing gas, said vertically oriented tubing runs each having a segment thereof within and traversing said tuyeres, an insulating lining on each of said segments constituting the inner surface of said annular gas passageway, said tuyeres being fixed and bonded at the lower ends thereof to said constriction plate, and secured at the upper ends thereof in a bonded joint to said vertical runs of tubing for support thereof.

2. The fluid bed reactor of claim 1 wherein the upper return bends are positioned within said body of fluidized particulate solids.

3. The fluid bed reactor of claim 1 wherein the upper return bends are positioned in the freeboard space above said body of fluidized particulate solids.

4. The fluid bed reactor of claim 1 wherein the portion of each of said vertical runs of tubing contacting said body of particulate solids has an elongated core member therein supported in a position on the axis of said vertical runs of tubing defining an annular channel between said core member and the wall of said vertical tubing whereby the process fluid in said annular channel is in contact with a relatively large heat transfer surface during passage through said vertical runs of tubing.

5. The fluid bed reactor of claim 1 in which the tuyeres associated with one or more heat exchanger coils are secured to a support plate which is removably fixed to a constriction plate member.

6. The fluid bed reactor of claim 1 in which the segments of said vertically oriented tubing runs within said tuyeres are located on the vertical axes of said tuyeres.

7. A fluid bed heat exchanger comprising a reaction chamber, a windbox separated from said reaction chamber by a constriction plate, a body of particulate solids subject to fluidization on said constriction plate, a plurality of heat exchanger coils comprising vertically oriented runs of tubing serially joined by upper and lower return bends, said vertical runs of tubing passing through said constriction plate and located in contact with said body of particulate solids for heat exchange with said solids in the fluidized state, said lower return bends located below said constriction plate, a plurality of elongated tuyere means in said constriction plate and extending into said reaction chamber having the combined functions of admitting fluidizing gas through said constriction plate into said reaction chamber, providing access through said constriction plate for said vertical runs of heat exchange tubing, supporting said vertical runs of tubing and providing a thermal sleeve to accommodate differential thermal expansion between said constriction plate and said vertical runs of tubing, said tuyeres each having therein an outer annular gas passageway for fluidizing gas, said vertically oriented tubing runs each having a segment of reduced cross-section located within and traversing said tuyeres, an insulating layer on each of said segments of reduced cross-section constituting the inner surface of said annular gas passageway, said tuyeres being welded at the lower ends thereof to said constriction plate, and secured by a weld joint at the upper ends thereof to said vertical runs of tubing for support thereof.

8. The fluid bed reactor of claim 7 wherein the upper return bends are positioned within said body of fluidized particulate solids.

9. The fluid bed reactor of claim 7 wherein the upper return bends are positioned in the freeboard space above said body of fluidized particulate solids.

10. The fluid bed reactor of claim 7 in which the segments of said vertically oriented tubing runs within said tuyeres are located on the vertical axes of said tuyeres.

11. The fluid bed reactor of claim 7 wherein the portion of each of said vertical runs of tubing contacting said body of particulate solids has an elongated core member therein supported in a position on the axis of said vertical runs of tubing defining an annular channel between said core member and the wall of said vertical tubing whereby the process fluid in said annular channel is in contact with a relatively large heat transfer surface during passage through said vertical runs of tubing.

12. The fluid bed reactor of claim 7 in which the tuyeres associated with one or more heat exchanger coils are secured to a support plate which is removably fixed to a constriction plate member.

* * * * *